3,311,626
CYCLOPENTAQUINOXALINE DERIVATIVES
Gerhard R. Wendt, Havertown, and Kurt W. Ledig, Philadelphia, Pa., assignors to American Home Products Corporation, New York County, N.Y., a corporation of Delaware
No Drawing. Filed June 27, 1966, Ser. No. 560,817
6 Claims. (Cl. 260—250)

This invention relates to cyclopentaquinoxalines and more particularly to polycyclic derivatives of the cyclo pentaquinoxalines and their method of preparation.

It is an object of the invention to prepare compounds falling with the following two general Formulae I and II:

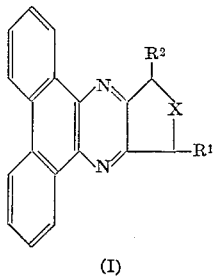

(I)

and

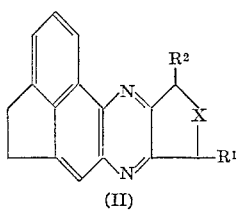

(II)

wherein $R^1$ is intended to represent hydrogen, phenyl or carb(lower)alkoxy, $R^2$ representing hydrogen, lower alkyl, carb(lower)alkoxy or phenyl. The phenyl radical may be substituted in the o, m, or p-positions by a lower alkyl, lower alkoxy, halo(lower)alkyl, preferably trifluoromethyl or a halogen atom, preferably chlorine. The symbol

is intended to represent an unsubstituted carbon, a carbon substituted by a carboxyl radical or a lower alkyl ester thereof or a carbon having a keto oxygen.

The expression "lower alkyl" or "lower alkoxy" is intended to mean radicals having 1 to 6 carbon atoms, either as a straight chain or branched.

The compounds of the invention have been found to possess pharmacological activities, mainly in their ability to control or moderate inflammatory conditions in the animal body. These compounds are deemed useful in experimental and comparative pharmacology. They may be used alone or combined with other active compounds or with well-known relatively inert solid or liquid carriers, extenders or excipients. Combination with other active anti-inflammatory compounds, for example, the salicylates and more particularly, acetyl salicylic acid is contemplated. The dosage range for compounds of the invention to achieve their pharmacological function is from 5 mg. to about 100 mg. on a daily basis, per kilogram of body weight. Administration is per os or parenterally.

In order to prepare the above-described compounds, one reacts a cyclopentandione either with a diaminophenanthrene to make compounds of the Formula I type or with a diaminoacenaphthene to make compounds of the Formula II type. The reaction is carried out in the presence of acetic acid as a promoter. An organic solvent, preferably a lower alkanol, is used and the reaction takes effect at refluxing temperatures.

The reactions forming the compounds of the invention may be illustrated by the following flow diagram:

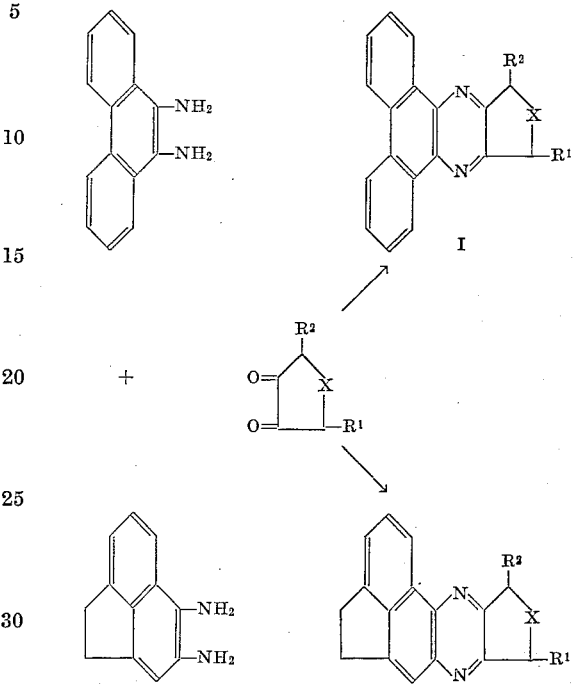

In the above diagram, the symbols X, $R^1$ and $R^2$ have the meanings previously described.

The following examples disclose the best mode contemplated for preparing compounds falling within the scope of the invention:

EXAMPLE 1

*10,12-dihydro-12-phenyl-11H-cyclopenta [b] dibenzo [f,h] quinoxalin-11-one*

A suspension of 1.3 g. of 9,10-diaminophenanthrene, 40 ml. of ethyl alcohol, 3 ml. of glacial acetic acid and 1.2 g. of 3-phenyl-1,2,4-cyclopentane-trione was refluxed for a few minutes. The reaction mixture was cooled and the precipitate filtered. Recrystallization from dimethylformamide afforded the title compound; M.P. 300° C. dec.

Found: C, 83.48; H, 4.78; N, 7.76%. $C_{25}H_{16}N_2O$ requires: C, 83.31; H, 4.48; N, 7.77%.

EXAMPLE 2

*10,12-dihydro-11H-cyclopenta [b] dibenzo [f,h] quinoxaline-10,12-dicarboxylic acid, diethyl ester*

A suspension of 1.3 g. of 9,10-diaminophenanthrene, 40 ml. of alcohol, 3 ml. of glacial acetic acid and 1.5 g. of 4,5-dioxo-1,3-cyclopentane dicarboxylic acid, diethyl ester and following the procedure given above in Example 1, will yield the title compound.

EXAMPLE 3

*4,5,8,10-tetrahydro-10-propyl-9H-cyclopent [b] indeno[7,1-f,g] quinoxalin-9-one*

An aqueous solution (150 ml.) of 2.5 g. of 3-propyl-1,2,4-cyclopentane-trione was shortly refluxed with a solution of 2.5 g. of 4,5-diaminoacenaphthene, 100 ml. of ethyl alcohol, and 3 ml. of acetic acid. The resulting precipitate was filtered off and recrystallized from dimethyl formamide to yield the title compound; M.P. 290° C. dec.

Found: C, 79.26; H, 5.94; N, 9.71%. $C_{20}H_{18}N_2O$ requires: C, 79.44; H, 6.00; N, 9.27%.

EXAMPLE 4

*4,5,8,10-tetrahydro-8,10-diphenyl-9H-cyclopent [b] indeno [7,1-f,g] quinoxalin-9-one*

Replacing the 3-propyl-1,2,4-cyclopentane-trione of Example 3 with an equivalent amount of 3,5-diphenyl-1,2,4-cyclopentane-trione but carrying out the procedure as described therein will yield the title compound.

EXAMPLE 5

*4,5,8,10-tetrahydro-9H-cyclopent [b] indeno [7,1-f,g] quinoxaline-9-carboxylic acid*

The above title compound may be made by following Example 3 but replacing the trione with an equivalent amount of 3,4-dioxocyclopentane-1-carboxylic acid and proceeding as disclosed therein.

EXAMPLE 6

*4,5,8,10-tetrahydro-9H-cyclopent [b] indeno [7,1-f,g] quinoxaline-10-carboxylic acid, ethyl ester*

Using an equivalent amount of 2,3-dioxocyclopentane-1-carboxylic acid ethyl ester in place of the trione of Example 3 and proceeding as disclosed therein will yield the title compound.

EXAMPLE 7

*4,5,8,10-tetrahydro-9H-cyclopent [b] indento [7,1-f.g] quinoxaline-8,10-dicarboxylic acid, diethyl ester*

Replacing the 3-propyl-1,2,4-cyclopentane-trione of Example 3 with an equivalent amount of 4,5-dioxo-1,3-cyclopentanedicarboxylic acid, diethyl ester but following that procedure will result in the title compound.

EXAMPLE 8

*4,5,8,10-tetrahydro-9H-cyclopent [b] indeno [7,1-f,g] quinoxaline-8,9,10-tricarboxylic acid, triethyl ester*

Following the procedure of Example 3, but replacing the trione used there with 4,5-dioxo-1,2,3-cyclopentane-tricarboxylic acid, triethyl ester, one will obtain the title compound.

EXAMPLE 9

*11,12-dihydro-10H-cyclopenta [b] dibenzo [f,h] quinoxaline-10,11,12-tricarboxylic acid, triethyl ester*

A suspension of 1.0 g. (5.0 mmoles) of 9,10-diaminophenanthrene, 1.5 g. (5.0 moles) of 4,5-dioxo-1,2,3-cyclopentane-tricarboxylic acid, triethyl ester and 2.5 ml. of acetic acid in 70 ml. of ethyl alcohol was heated to reflux for two hours (pH=3.5). The reaction mixture was filtered while hot, cooled, and the resulting yellow precipitate collected. Two recrystallizations from ethyl alcohol yielded 0.8 g. (33%) of the title compound, M.P. 163–164° C., $\lambda_{max}^{KBr}$ 5.76 (vs. >C=O of an ester) and 6.13 (m.>C=N—)$\mu$.

Found: C, 69.21; H, 5.33; N, 5.60%. $C_{28}H_{26}N_2O_6$ requires: C, 69.12; H, 5.39; N, 5.76%.

EXAMPLE 10

*10,12-dihydro-11H-cyclopenta [b] dibenzo [f,h] quinoxaline 11-carboxylic acid*

A suspension of 1.0 g. of 9,10-diaminophenanthrene and 0.71 g. of 3,4-dioxocyclopentane-1-carboxylic acid in 2.5 ml. of acetic acid and 70 ml. of ethyl alcohol is reacted as described in Example 9 above, to obtain the title compound.

EXAMPLE 11

*10,12-dihydro-11H-cyclopenta [b] dibenzo [f,h] quinoxaline-12-carboxylic acid, ethyl ester*

Replacing the 4,5-dioxo-1,2,3-cyclopentane-carboxylic acid triethyl ester of Example 9 with 0.85 g. of 2,3-dioxo-cyclopentane-1-carboxylic acid, ethyl ester, but using the same promoter and solvent and following the same procedure, the title compound will be obtained.

We claim:

1. A compound selected from the group consisting of compounds having the formulae:

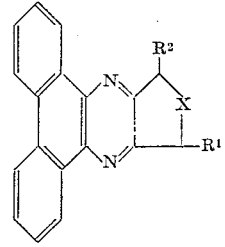

and

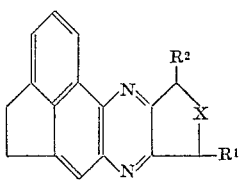

in which R$^1$ is a member of the group consisting of hydrogen, phenyl and carb(lower)alkoxy, while R$^2$ is of the group consisting of hydrogen, lower alkyl, carb(lower)alkoxy and phenyl while

is a member of the group consisting of

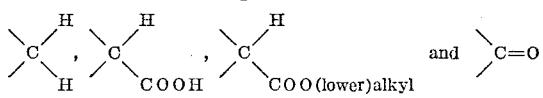

2. As a compound of claim 1; 10,12-dihydro-12-phenyl-11H-cyclopenta [b] dibenzo [f, h] quinaxolin-11-one.

3. As a compound of claim 1; 4,5,8,10-tetrahydro-10-propyl-9H-cyclopent [b] indeno [7,1-f, g] quinoxalin-9-one.

4. As a compound of claim 1; 11,12-dihydro-10H-cyclopenta [b] dibeno [f, h] quinoxaline-10,11,12-tricarboxylic acid, triethyl ester.

5. As a compound of claim 1; 10,12-dihydro-11H-cyclopenta [b] dibenzo [f, h] quinoxaline-11-carboxylic acid.

6. As a compound of claim 1; 4,5,8,10-tetrahydro-9H-cyclopent [b] indeno [7,1-f, g] quinoxaline-8,10-dicarboxylic acid, diethyl ester.

No references cited.

NICHOLAS S. RIZZO, *Primary Examiner.*